(12) United States Patent
Park et al.

(10) Patent No.: US 12,101,535 B2
(45) Date of Patent: Sep. 24, 2024

(54) VIDEO CURATION SERVICE METHOD

(71) Applicant: Freeyo Corp., Seoul (KR)

(72) Inventors: Sung Hyun Park, Seoul (KR); Eun Young Hong, Seoul (KR)

(73) Assignee: Freeyo Corp., Seoul (KR)

( * ) Notice: Subject to any disclaimer, the term of this patent is extended or adjusted under 35 U.S.C. 154(b) by 0 days.

(21) Appl. No.: 18/171,435

(22) Filed: Feb. 20, 2023

(65) Prior Publication Data

US 2023/0209148 A1    Jun. 29, 2023

Related U.S. Application Data

(63) Continuation of application No. PCT/KR2020/011121, filed on Aug. 20, 2020.

(51) Int. Cl.
*H04N 21/488* (2011.01)
*H04N 21/25* (2011.01)
*H04N 21/2743* (2011.01)
*H04N 21/43* (2011.01)

(52) U.S. Cl.
CPC ....... *H04N 21/4884* (2013.01); *H04N 21/251* (2013.01); *H04N 21/2743* (2013.01); *H04N 21/43074* (2020.08)

(58) Field of Classification Search
CPC ............. H04N 21/4884; H04N 21/251; H04N 21/2743; H04N 21/43074; H04N 21/4431; H04N 21/4756; H04N 21/4782; H04N 21/252; H04N 21/25891; H04N 21/84; G10L 21/10; G10L 15/22; G10L 15/26; G10L 15/30; G06N 3/08; G11B 27/031; G11B 27/11
See application file for complete search history.

(56) References Cited

U.S. PATENT DOCUMENTS

| | | | |
|---|---|---|---|
| 9,854,324 B1* | 12/2017 | Panchaksharaiah | ........................ H04N 21/8106 |
| 10,694,140 B1 | 6/2020 | Chen et al. | |
| 2015/0186343 A1* | 7/2015 | McGill | ............. H04N 21/8541 715/234 |
| 2018/0358049 A1 | 12/2018 | Latulipe et al. | |
| 2020/0135225 A1* | 4/2020 | Vaughn | ............ H04N 21/25891 |
| 2021/0243502 A1* | 8/2021 | Choi | ................. H04N 21/26603 |

FOREIGN PATENT DOCUMENTS

| | | |
|---|---|---|
| KR | 10-2002-0031902 A | 5/2002 |
| KR | 10-2009-0097054 A | 9/2009 |
| KR | 10-2015-0017480 A | 2/2015 |

OTHER PUBLICATIONS

International Preliminary Report on Patentability for PCT/KR2020/011121, dated Feb. 16, 2023.

* cited by examiner

*Primary Examiner* — Alazar Tilahun
(74) *Attorney, Agent, or Firm* — United One Law Group LLC; Kongsik Kim; Jhongwoo Peck

(57) ABSTRACT

A video curation service (VCS) method provides video content provided by an open streaming service (OSS) by adding video content information in conjunction with the OSS. The VCS method comprises: a step in which a subtitlist produces subtitle data with regard to predetermined video content provided from an OSS server, and uploads same onto a VCS server; and a step in which the VCS server operates a web or app page for viewing video content on a viewer terminal in accordance with a request of a viewer.

7 Claims, 11 Drawing Sheets

FIG. 6

```
<html>
<head>
<meta http-equiv="Content-Type" content="text/html; charset=utf-8" />
<title> </title>
<link rel="stylesheet" href="/css/style.css">
<script type="text/javascript" language="javascript" src="/js/function.js"></script>
<script type="text/javascript" language="javascript" src="/js/formChecker.js"></script>
<script language="javascript" src="https://ajax.googleapis.com/ajax/libs/jquery/3.3.1/jquery.min.js"></script>
<style>
.caption_area{height: 100px;width:830px;overflow: hidden;background:#000000;padding:5px 5px;display:block;position
.caption_content {max-width:700px;margin:0 auto;height:80px;overflow:yi scrollcolor:#fff00;font-size:18px; line-
.caption_content::-webkit-scrollbar {display: none;}
</style>
<script src="https://apis.google.com/js/api.js"></script>
<script language="javascript">
var tag = document.createElement('script');
tag.src = "https://www.youtube.com/iframe_api";
var firstScriptTag = document.getElementsByTagName('script')[0];
firstScriptTag.parentNode.insertBefore(tag, firstScriptTag);
//=========================================================
var preIdx = -1;
var timerP = 200;
var updateP = 10;
var timeLap = 0;
var timeupdater = null;
var play_youtube = "*_F1Ale9_bW";
```

FIG. 7

```
← → C  ⊙ view-source:https://www.esunbon.org/test/movie.php

// 
function updateTime() {
    timeout;
    g_videotime = player.getCurrentTime(); // extract play time   ← 701
    $("#dv_playtime").html(g_videotime);
    //
    var capIdx = -1;
    try {
        capIdx = captionTime.findIndex(checkExp); // find subtitle caption for play time   ← 702
    } catch (e) { try { capIdx = findIndexE(captionTime);} catch (e) {return;}}
    //
    if (capIdx >= 0) {
        capIdx--;
        if (capIdx != preIdx) {
            preIdx = capIdx;
            var cap0bj = captionData[capIdx];
            if (cap0bj[j] != null) {$("#caption").html(cap0bj[j][2]);} // display caption   ← 703
        } else {
```

FIG. 8

```
← → C  ⊙ www.example.http://www.example.org/testmovie.php for (var i=0; i<arrayList.length; i++) {if (arrayList[i] >= g_v.videoTime) {return i;}}
return -1;
} captionTime.push(0);// caption information for each time zone
captionData.push(Array(0,9, " conduct test 1
captionTime.push(10);
captionData.push(Array(10,19, " conduct test 2
captionTime.push(20);
captionData.push(Array(20,29, " conduct test 3    <br>"));
captionTime.push(30);
captionData.push(Array(30,39, " conduct test 4    <br>"));
captionTime.push(40);
captionData.push(Array(40,49, " conduct test 5    <br>"));
captionTime.push(50);
captionData.push(Array(50,59, " conduct test 6    "));
captionTime.push(60);
captionData.push(Array(60,69, " conduct test 7    "));
captionTime.push(99999999);
</script>
<body style="background: #FFFFFF;">
<table class="center" style="max-width: 1920px;">
<tr>
<td style="height: 500px; padding-top: 70px;"><div style="background: #000000; width: 800px;"><div id="player" style="display: inline-block;"></div></div>
</td>
</tr>
<tr>
<td>
    <div id="caption" class="caption_content"></div>
</td>
</tr>
</tr>
<td style="font-weight: bold; font-size: 30px; padding: 5px;">
    <div id="dv_playtime" style="display: inline-block;"></div></div></td></tr>
```

818                                                              802

VIDEO CURATION SERVICE METHOD

CROSS-REFERENCE TO RELATED APPLICATION

This application is a Continuation of PCT/KR2020/011121 filed on Aug. 20, 2020, which is incorporated herein by reference in its entirety.

TECHNICAL FIELD

The present invention relates to a video curation service (VCS) for providing video content, provided by an open streaming service (OSS), by adding subtitle content information in conjunction with the OSS, such as YouTube or Dailymotion. More specifically, the present invention relates to a method for activating third-party subtitles and a VCS for providing upgraded video content thereby.

RELATED ART

Video viewers no longer depend only on mass media. Open streaming service (OSS), such as YouTube or Dailymotion, is becoming increasingly dominant viewing methods. In the present specification, 'OSS' refers to a streaming service that: (a) allows anyone to post or view video content; (b) provides a search application program interface (API); (c) provides an inline frame (iframe) link to the outside; (d) provides an 'iframe player API' so that, regarding video streaming by OSS within an iframe, a page accepting this (hereinafter 'accepting page') producer can obtain information related to video content being played or manipulates the play method of video content.

The 'search API' allows an OSS to use a search function for its own video content by an external server. Currently, all dominant OSSs such as YouTube or Dailymotion provide search APIs. The iframe refers to a method in which another HTML web or app page (hereinafter referred to as 'accepted page') appears as an inline frame within one HTML page (hereinafter referred to as 'accepting page'). For example, it is a case where an internal window where a YouTube video is playing is present in a blog page. The iframes is established when the 'accepted page' (in the above example, a page on YouTube) has to support iframe. In the case of supporting iframe, information called 'embedding code' ('accepting page' can identify and link 'accepted page' on the Internet) has to be provided. Currently, all dominant OSSs such as YouTube or Dailymotion provide iframe embedding code.

The 'iframe player API' refers to the link interface provided by OSS, so as to be able to independently control the size of the iframe, video volume, play on-off, play point movement, resume play, etc. by using JavaScript on the 'accepting page' side instead of using the embedding code. For security, the HTML standard makes it impossible to find out information about progress within an iframe (for example, information about video play time) on the side of the 'accepting page', that is, outside the iframe. The iframe player API overcomes these limitations, and is an API in which the iframe providing side ('accepted page') provides information about progress within the iframe to the outside of the iframe, that is, the 'accepting page' side, and controls the progress within the iframe. In other words, 'iframe player API' is not an API that interworks with 'player software that exists separately from a browser', and is provided by the 'accepted page' side so as to perform control and provide information about the progress inside the 'iframe HTML page' ('accepted page') (handled by the browser), and refers to an interface that makes it available through JavaScript that exists outside the iframe.

That is, when playing video content provided by an OSS in an iframe, there are two methods of using the embedding code or using the iframe player API (in a case where JavaScript can be programmed by self-producing the accepting page). Dominant OSSs such as YouTube or Dailymotion all provide 'iframe player API' as well as 'iframe embedding code'.

FIG. 1 is a diagram for describing a typical OSS ecosystem of a two-party structure including a video publisher and a viewer. As illustrated in FIG. 1, in the typical OSS of the two-party structure, a publisher 169 uploads (posts) video content 113 to an open streaming service server (OSS) 102. The OSS 102 provides a web or app page 340 including a video window 342 on which the video content 113 is played. According to a request or selection 112 of a viewer 104, the video content 113 is selected and transmitted from the OSS 102 and played on the video window 342 of the web or app page 340. That is, it can be said that the typical OSS is an ecosystem of two participants, that is, the video publisher 169 and the viewer 104.

SUMMARY

Under the above conditions, an object of the present invention is to provide a method for solving the following problems.
(a) Addition of Free Subtitle Production by Third Parties A first object of the present invention is to allow any third party to freely add and provide a subtitle, for example, translated caption, so that video content can be delivered globally beyond language barriers. An 'arbitrary third party' that produces and adds subtitles is called a 'subtitlist' in the present invention. In other words, an existing OSS ecosystem with a two-participant category structure including a video publisher and a viewer is expanded to a three-participant category structure including a video publisher, a viewer, and a subtitlist.

For reference, the current OSS has limitations in that; (a) unless the video publisher allows 'production and addition of subtitles by any third party' in advance, the production and addition of subtitles by third parties is fundamentally prohibited; (b) even if the video publisher permits 'the production and addition of subtitles by an arbitrary third party' in advance, it usually takes about 10 days after the subtitle is submitted and reflected (with the consent of the video publisher); and (c) the subtitle is overlaid on the video.

In other words, (a) in most cases, third parties are set up not to produce subtitles at all; (b) exceptionally, even when a third party's subtitle production is permitted, it takes an excessively long time from submission to reflection of the subtitle; and (c) as subtitles are overlaid on the video, they directly affect original video content. In the case of (a), global dissemination of video content beyond language or cultural barriers is restricted. In the case of (b), since it takes a long time from submission to reflection of the subtitle, global dissemination of highly timely content such as news or current affairs criticism is blocked. In the case of (c), since the subtitle is overlaid on the video, first, it has a great impact on the business of OSS, which is the subject of video play (for example, subtitles compete for 'space occupancy' for banner advertisements appearing in the lower part of the video screen); second, even though it is a subtitle by a third party, it gives an implication or meaning as if the video publisher is 'responsible for and guarantees the contents of the subtitle'; and there is a problem of preventing the OSS from welcoming 'free addition of subtitle production by any third party'. Therefore, it seems that the OSS is not enthusiastic about 'adding free subtitle production by any third party'.

Therefore, the first problem to be solved by the present invention is to allow a third party to freely produce and add subtitles in a way that does not harm the rights and interests of OSS or video publisher. That is, the first problem to be solved by the present invention is to provide a method and a system for allowing third parties (subtitlists) to freely participate in the production of subtitles in a way that does not harm the interests of OSS or video publisher; and allowing other viewers to freely enjoy 'subtitle-enriched video (SEV)', which is produced as a result. In other words, the present invention provides a method for changing an existing OSS ecosystem with a two-participant category structure including a video publisher and a viewer to an ecosystem of a three-participant category structure including a video publisher, a viewer, and a subtitlist.

(b) Embedding into External Page

The second and subsequent problems to be solved by the present invention are additional problems resulting from the solution of the first problem. Therefore, it is necessary to briefly describe how the present invention solves the first problem.

In the present invention, in order to solve the first problem, (a) video content of an OSS is played through a video inline frame (VIF) of a video curation service web or app provided by the video curation service (VCS); (b) the subtitle is played through a subtitle window (exterior subtitle frame: ESF) that exists separately outside the VIF of the video curation service web or app; (c) video content (subtitle-enriched video: SEV) is provided by synchronizing the video flow played by the OSS in the VIF and the subtitle flow played in the subtitle window (ESF).

The Internet is a huge world in which countless HTML, pages are connected and proliferated. Even when the SEV is realized by the present invention, if video content (SEV) to which the subtitle according to the present invention is added by the viewer (content including video content played in the VIF and subtitle played in the subtitle window (ESF)) cannot be freely iframe-embedded in countless foreign pages that exist outside, such as bulletin boards and blogs, watching the SEV is isolated from the video curation service web or app provided by the VCS, and its benefits are inevitably limited.

Therefore, the second problem to be solved by the present invention is to provide an embedding code so that a viewer who has permission to write on an external page (bulletin board, blog, etc.) can easily iframe-embed the SEV.

(c) Curation Service

As video content is accumulated in the OSS, the number of viewers using the OSS is increasing, the need to use video content of the OSS for learning is getting stronger, and accessibility to high-quality videos made in foreign languages improves due to SEV according to the present invention, the VCS provided by the present invention (a) not only presents a 'watchable video' or 'have-to-watch list' on a page assigned to itself; (b) receives view status info (VSI) about individual content of each member (individual viewer) who has subscribed to the page; and (c) requires a person (curator) who manages or encourages member viewing/learning, and an activity (curation) thereof.

The third problem to be solved by the present invention is to enable these curatorial and curation activities to further evolve an OSS ecosystem with a three-participant category structure including a video publisher, a viewer, and a subtitlist into an ecosystem with a four-participant category structure including a video publisher, a viewer, a subtitlist, and a curator.

(d) External Server Link

Among learning-oriented organizations such as cyber schools, cyber churches, and cyber NGOs, instead of using web or app pages provided by the VCS according to the present invention, (a) while showing the SEV according to the present invention in an iframe in the self-operated web/app, (b) there is a need to consolidate VSI of members about SEV to its own server.

In particular, the consolidation is also in need when the learning-oriented organizations use inhouse-only video contents that are not published on OSS, in addition to the SEV provided by the present invention. When the learning-oriented organization that publishes and uses inhouse-only video contents only on its own web/app (without being posted on OSS) intends to add and use the SEV according to the present invention as a learning material, the following two cases encounter serious difficulties.

First, a learning leader of a learning-oriented organization becomes a curator in the VCS provided by the present invention and opens a gallery, subscribes members to the gallery, identifies an ID (or user name) in the gallery, and makes a member watch SEV in the gallery. In this case, there occurs a problem that the member has to go back and forth between two domains to view video content, and there also occurs a problem that, as for inhouse-only video content, the learning leader needs to view the information for member's learning/viewing management on his/her own server, and regarding SEV, the learning leader needs to view information for learning/viewing management of members in a VCS server of the present invention. Second, the SEV is posted as an iframe on its own web/app, and the member watches the SEV through its own web/app. In this case, there is a problem that VSI of a member cannot be obtained for SEV.

Therefore, further another problem to be solved by the present invention is to provide a method in which a learning-oriented organization posts SEV as an iframe on its own web/app server and the member's VSI information about the SEV can be retrieved from its own server.

In order to achieve the objects, the present invention provides a video curation service (VCS) method including: a step in which, regarding predetermined video content (113) provided by an open streaming service server (OSS) (102), a subtitlist (106) produces subtitle data (118) and uploads the subtitle data (118) to a video curation service server (VCS) 101; and a step in which the VCS (101) drives a web or app page (140) for viewing video content in a viewer terminal in accordance with a request (222) of a viewer (104), wherein the web or app page (140) for viewing the video content comprises a video iframe window (VIF) (142) for playing the video content (113) transmitted from the OSS (102), and a subtitle window (ESF) (141) for externally playing the subtitle data (118) transmitted from the VCS (101), and the subtitle (118) is played in a subtitle window (ESF) (141) in synchronization with a play time (VPT) of the video content (113).

According to a video curation service (VCS) according to the present invention, (a) any third party can freely provide subtitles to video content provided in an open streaming service (OSS); (b) it is possible to embed it into an external server; (c) curation activities that manage or encourage individual viewers to watch/learn video content are possible; and (d) such curation can also be performed on an external server.

BRIEF DESCRIPTION OF THE DRAWINGS

FIGS. 6 to 8 are pictures showing webpage source codes for implementing a VCS method according to an embodiment of the present invention.

DETAILED DESCRIPTION

Figure 1:
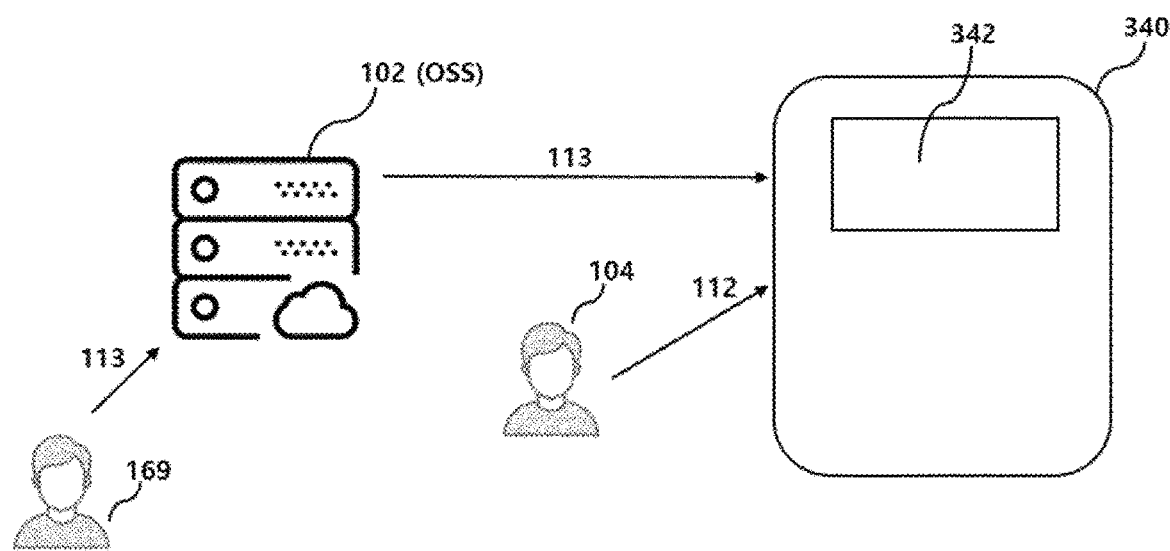
FIG. 1 is a diagram for describing a typical open streaming service (OSS) ecosystem of a two-party structure including a video publisher and a viewer.

The present invention will be described in detail with reference to the accompanying drawings.

Four problems to be solved by the present invention, that is, (a) addition of free subtitle production by third parties in a way that does not infringe on open streaming service (OSS) and the rights and interests of video publishers, (b) embedding into external pages, (c) curation service, (d) external server link support, have a sequence relationship. Therefore, techniques for solving these problems will be sequentially described. In the present invention, iframe player API functions of OSS (YouTube, Dailymotion, etc.) that provide functions such as free video posting and viewing, search API, and iframe player API may implement a new and innovative video curation service (VCS) by using JavaScript.

The VCS according to the present invention searches video contents of an OSS according to a viewer's search keyword, and provides a search result (list) in text or thumbnail format; if the viewer selects one of these, based on a function of playing video through a video inline frame (VIF) window, (a) enables any third party to add and post subtitles to upgrade video content of an OSS to 'video with a subtitle added in an external manner', that is, subtitle-enriched video content (SEV);

(b) provides a 'cascading forked iframe (CFIF) embedding method so that viewers can easily iframe-embed the SEV in an external page;

(c) provides view status info (VSI) for individual video contents of individual members so that a person who engages in learning-oriented organization activities provides curation services for learning-oriented members by using SEV; and (d) when a learning-oriented organization iframe-embeds the SEV on its own web, provides 'VSI based on viewing ID code value' to the server of the learning-oriented organization through server-to-server communication in relation to the member's viewing of video content, so that the relevant learning-oriented organization can manage the learning/viewing of members 'regarding learning using the SEV' in its own database.

Hereinafter, with reference to the drawings, the configuration and operation of the VCS of the present invention will be described in separate items: (i) duplex synchronous parallel play, (ii) cascading branching iframe, (iii) obtaining and providing VSI for learning/viewing management, and (iv) Providing VSI using SEV iframe player API.

(I) Addition of Subtitle Production (Duplex Synchronous Parallel Play)

The first object of the present invention is to enable video content to be delivered globally beyond language barriers because any third party can freely add and provide a subtitle, for example, translated caption, in a way that does not infringe on the rights and interests of an OSS or a video publisher, and to expand an OSS ecosystem including a video publisher and a viewer to an ecosystem of a three-participant category structure including a video publisher, a viewer, and a subtitlist. A third party that freely produces and adds subtitles in this way is referred to as a 'subtitlist' in the present specification.

Figure 2:
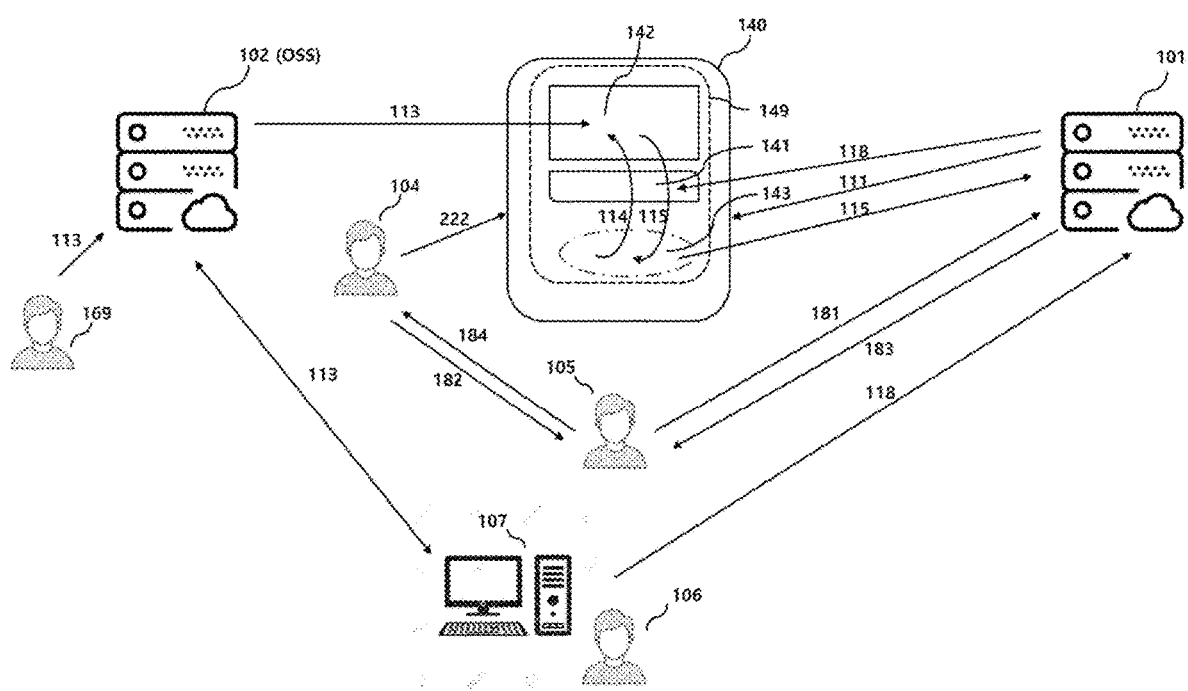
FIG. 2 is a diagram for describing a process in which a video publisher, a viewer, a subtitlist, and a curator interact with each other in a video curation service method according to an embodiment of the present invention.

FIG. 2 is a diagram for describing a process in which a video publisher, a viewer, and a subtitlist interact with each other in a video curation service method according to an embodiment of the present invention. As illustrated in FIG. 2, in the video curation service method according to an embodiment of the present invention, a subtitlist 106 uses a subtitlist terminal 107, such as a PC or laptop, to produce subtitle data 118 with respect to predetermined video content 113 provided by an open streaming service server (OSS) 102 that a VCS 101 according to the present invention shows through an iframe on a web, and uploads it to the video curation service server (VCS) 101. The uploading of the subtitle data 118 may be performed through a predetermined subtitle upload user interface (UI) (not illustrated) provided by the VCS 101, for example, a web page (not illustrated). The subtitle data 118 generated by the subtitle upload UI includes subtitle play point info (SPPI) for a subtitle play point (time information). That is, when the subtitlist produces the subtitle 118 by using the web for producing subtitles provided by the VCS 101, the subtitlist 106 inputs information indicating which section of the subtitle 118 is played from which point to which point of a video play time (VPT), that is, SPPI.

The VCS 101 transmits a source file 111 of a web or app page 140 for viewing video content to the viewer terminal in accordance with a request 222 of a selection, a command, etc. of a viewer 104, and drives the web or app page 140 for viewing video content in a viewer terminal. The web or app page 140 for viewing video content includes a video iframe window (VIF) 142 for playing the video content 113 transmitted from the OSS 102, and a subtitle window (exterior subtitle frame: ESF) 141 that externally plays the subtitle data 118 transmitted from the VCS 101.

In addition, the web or app page 140 for viewing video content detects player status information (PSI) 115 such as VPT of the video content 113 played in the VIF 142 by using an iframe player application program interface (API) 114 provided by the OSS 102, detects SPPI included in the subtitle data 118, and plays the subtitle 118 in the subtitle window (ESF) 141 in synchronization with the VPT of the video content 113. The PSI 115 is a signal indicating on/off of the player. In the case of dominant OSS 102 such as YouTube or Dailymotion, the PSI 115 may be obtained by using the iframe player API 114.

In addition, regarding synchronization between the VIF 142 and the subtitle window (ESF) 141, a synchronization JavaScript (SJS) 143 is implemented which finds the PSI 115 such as VPT from an OSS iframe player running in the VIF 142 in the user web/app page 140 provided by the VCS 101 at frequent intervals (e.g., intervals of 0.1 seconds) by using the iframe player API, searches for the SPPI included in the subtitle data 118, finds a section of the subtitle 118 having an SPPI value corresponding to the VPT, and displays the section of the subtitle 118 on the subtitle window (ESF) 141.

In addition, the web or app page 140 for viewing video content uses the SJS 143 to transmit the PSI 115 such as VPT periodically (for example, at intervals of 1 second) to the VCS 101, so that the VCS 101 calculates the VSI of the viewer 104 (for example, information about when and from which section the user viewed the video content 113).

The function of the VCS 101 according to the present invention is described in more detail as follows.

(1) The subtitlist 106 provides a UI (not illustrated), for example, a web page, through which the subtitle data 118 including the SPPI can be input.

(2) Since the following (2.1) and (2.2) are included in the source file 600 of the web or app page 140 for viewing video content, for example, the HTML, page (see FIGS. 6 to 8), the video content 113 and the subtitle 118 are synchronized and played in the subtitle window (ESF) 141 existing outside the VIF 142.

(2.1) Code for generating a separate subtitle window (ESF) 141 in which the subtitle 118 is played (602 of FIG. 6, lines 11 to 13 of the HTML source code; 802 of FIG. 8, lines 121 to 122 of the HTML source code);

(2.2) Sync JavaScript 143 including data or logic codes such as the following (2.2.1) to (2.2.6) that work with the iframe player API 114 provided by the OSS 102 (lines 15 to 110 of the source file of FIGS. 6, 7, and 8);

(2.2.1) iframe player API initialization 512 of the OSS 102 (lines 15 to 20 of FIG. 6)

(2.2.2) iframe source information 601 capable of identifying and connecting the video content 113 of the OSS 102;

(2.2.2) subtitle data 818, secured by the above (1), including the SPPI for controlling the flow of the subtitle 118 (lines 97 to 111 of FIG. 8);

(2.2.3) a logic 701 for detecting the VPT according to the video flow from the function built into the iframe page provided by the OSS 102 (i.e. the iframe player) through the iframe player API 114 at the frequency (e.g., 0.1 second) at which the video flow and subtitle flow can be synchronized seamlessly;

(2.2.4) a logic 702 for searching the SPPI and finding the section of the subtitle 118 to be played according to the VPT;

(2.2.5) a logic 703 for synchronizing and playing the section of the subtitle 118 corresponding to the VPT) in the subtitle window (ESF) 141; and (2.2.6) a logic (not illustrated) for transmitting the VPT or video-progress-check information, which collectively refers to the PSI 115 (Separately, the JavaScript 143 finds out the on/off state of video play through the iframe player API 114) to the VCS 101 at the frequency sufficient (for example, at intervals of 1 second) to find out from where the viewer 104 viewed from where to where (subsequently, by calculation by the VCS 101).

That is, the video content 113 of the OSS 102 is played as an iframe in the VIF 142 (for example, 542 in FIGS. 5 and 952 in FIG. 9), the subtitle 118 is played in the subtitle window (ESF) 141 (for example, 541 in FIGS. 5 and 951 in FIG. 9), which exists separately outside, that is, an external space, and the flow of the video content 113 and the flow of the subtitle 118 are synchronized by the SJS 143. In the present specification, this is referred to as duplex synchronized parallel play. It is duplex (two layers) because the subtitle window (ESF) 141 exists outside the VIF 142, and it is synchronous parallel play since the flow of video content 113 in the VIF 142 and the flow of subtitle 118 in the subtitle window (ESF) 141 are synchronized and run side by side.

The reason why the duplex synchronous parallel play structure for producing and publishing subtitles according to the present invention does not infringe on the rights and interests of the video publisher 169 and the OSS (102) provider because; first, the subtitle window (ESF) 141 exists outside the VIF 142, thereby not infringing on the publication right of the OSS; second, the OSS video content 113 spreads beyond language or cultural barriers and increases the number of views, thereby increasing OSS advertising revenue; and third, the OSS increases the profit of the video publisher (copyright holder) 169 by increasing the revenue distributed to the video publisher 169. That is, the present invention allows any third party 106 to freely produce and publish a subtitle in a way that does not infringe on the rights and interests of the OSS and the video publisher 169.

When the subtitle 118 is a translation, the present invention provides a method and a system, as a technical means for further protecting the copyright of the video publisher 169, including:

(1) a step in which the operator of the VCS 101 determines whether the newly added subtitle 118 is a translation, for example, by a program of the VCS 101 (sometimes comments, annotations may be subtitles 118);

(2) a step in which, regarding the subtitle 118 determined to be 'translation' by the operator of the VCS 101, when 'translation' is marked in the VCS 101, the VCS 101 automatically generate a message containing; (a) a brief description of the VCS according to the present invention; (b) contents notifying that the translation subtitle 118 to be played in the subtitle window (ESF) 141 has been added by the video curation service user 106; (c) when there is a 'disapproval' intention to the addition of translation in the subtitle window (ESF) 141, information indicating how to send disapproval, such as an email account or a specific page URL; and (d) automatically enters a comment on the OSS (102) page where the corresponding video content 113 is posted;

(3) a step in which, in a case where the video publisher 169 expresses the disapproval intention according to the method of '(2)' above, when the VCS operator confirms the reason and inputs it to the VCS 101, automatically deletes the translation subtitle 118 from the web/app 140 of the VCS;

(4) a step in which the VCS 101 notifies the translation subtitlist 106 of the deletion fact and the reason thereof by e-mail or a route corresponding thereto; and (5) a step in which the VCS 101 notifies the video publisher 169 of the above deletion through e-mail or a route corresponding thereto.

The copyright protection reinforcement method provided by the present invention is referred to as Ex Post Reinforcement (EPR). In this case, Ex Post means 'after the subtitle is posted once'.

Prior to the present invention, there was no innovative third-party value-added service using the iframe player API 114 because; in order to be an innovative third-party value-added service, (a) the service has to be a service that is difficult for the OSS 102 to directly implement (necessity of a third party service); (b) has to be a service having a clear benefit to the viewer 104 (viewer benefit); (c) and has to be a service (legitimacy) that does not infringe on the rights and interests of the OSS 102 with publishing rights and the video publisher 169 with copyrights.

Unless the OSS 102 is a service difficult to provide directly because of various strategic or conditional determinations about the business (e.g., strategic determinations about space competition between advertisements and subtitles within a screen), the OSS 102 directly provides the serve. Therefore, there is no need to use the iframe player API 114, nor is there a need for third party value-added services. In addition, when a clear benefit cannot be given to the viewer, not only the innovative service, but the service itself is not established. In addition, when the publication right of the OSS 102 or the copyright of the video publisher is violated, normal service cannot be provided. Since all of these three requirements are not satisfied, there has been no innovative value-added service by a third party using the iframe player API 114 and JavaScript 143.

On the other hand, the service method of the present invention satisfies all of the above requirements. For example, how the problem of free subtitle production and publication by third parties satisfies the above requirements will be described below.

First, Need for Third-Party Services

From the point of view of the OSS 102, which is a large global organization, when translation by any third party is freely allowed on its own web/app (340 in FIG. 1), the effort of the service operation personnel is excessive for the quality and suitability management. It is more appropriate for such value-added services to be provided by an external third-party value-added service provider. In addition, from the point of view of the OSS 102, when the translation subtitle is overwritten and displayed in the existing video window 342, it has to endure a collision with a banner advertisement that is intermittently overlapped and played in the space. However, there is a problem in that when the translation subtitle window is pulled out of the video window 342, it conflicts with the existing design philosophy. Therefore, it is appropriate for the external subtitle window (ESF) 141 to be provided by a third-party value-added service provider.

In addition, from the point of view of the OSS 102, when the translation subtitle freely produced by the third party is overwritten in the existing video window 342, it is like sending an impression or suggestion to the viewer 104 that the OSS 102 or video publisher 169 has reviewed and approved the accuracy and quality of the translated subtitle content. Therefore, it is more appropriate for the third-party value-added service provider to play this type of subtitle in the subtitle window (ESF) 143 existing outside the video window (VIF) 142.

In addition, from the point of view of the OSS 102, when any third party (subtitlist) is allowed to freely add translated subtitles, a very hard-to-define problem is encountered: how to distribute revenue between the subtitlist and the video publisher 169. Therefore, it is more appropriate for the third value-added service provider (VCS) 101 to manage the subtitle 118 to be played in the subtitle window (ESF) 141 and the subtitlist 106 that produces it.

Second, Viewer Benefits

According to the present invention, first, among viewers, a new type of viewer called subtitlist 106, who attaches a translation subtitle to a video in a foreign language or attaches a comment/annotation subtitle to a video with difficult content, can exist; second, as will be described in detail below, among the viewers, a new type of viewer named curator 105, who uses the enormous video content 113 existing in the OSS 102 to build a learning-oriented organization, can exist; third, viewers can quickly enjoy high-quality video content beyond language and cultural barriers; fourth, learning-oriented organizations that have been educating their members with inhouse-only video contents can use the enormous video contents 113 existing in the OSS 102 as teaching materials; and fifth, viewers of the OSS 102 can participate in curation services related to learning/viewing beyond the behavior of watching individually for entertainment.

Third, Legality

According to the present invention, first, since the subtitle window (ESF) 141 is placed outside the VIF 142, the publication right of the OSS 102 is not infringed; second, since the number of video views is increased, the revenue of the OSS 102 and the publisher 169 is increased; and third, since the copyright of the publisher 169 is further protected by the EPR, it does not infringe on the rights and interests of the OSS 102 or the video publisher 169.

As such, the present invention satisfies all of the requirements to be met by innovative third-party value-added services that link with the OSS 102 by utilizing the iframe player API (114), such as the need for third-party services, user benefits, and legality. The present invention has evolved the OSS (102) service ecosystem itself by initiating the development of third-party value-added services using the iframe player API 114. In addition, according to the present invention, the video content 113 of the OSS 102 is extended to the SEV 149 by the subtitlist 106, and thus, it has gained global dissemination power beyond language and cultural barriers. Viewers have the opportunity to understand and consider the video content 113 that is being uploaded by publishers from all over the world and is accumulating at an incredibly fast pace.

(II) Embedding into External Pages (Cascading Branching iframe)

According to another embodiment of the present invention, the viewer who has permission to write on the external page, such as a bulletin board or blog, can easily post the SEV 149 to the external page as an iframe. That is, the present invention provides an iframe embedding code for embedding the SEV 149 in an external page.

The two methods that are present in the above iframe have been described: the method of copying and pasting the accepted page, in the case of the present invention, the embedding code provided by the SEV 149, to the external page (accepting page, usually bulletin board or blog); and the method of programming JavaScript, which controls various functions such as window size, volume, and on/off of the iframe in conjunction with the iframe player API provided by the server of the accepting page, in the HTML of the receiving page.

Embedding of the SEV 149 in the external page according to the present invention will be described with reference to FIGS. 4, 5, 9 and 10.

Figure 4:
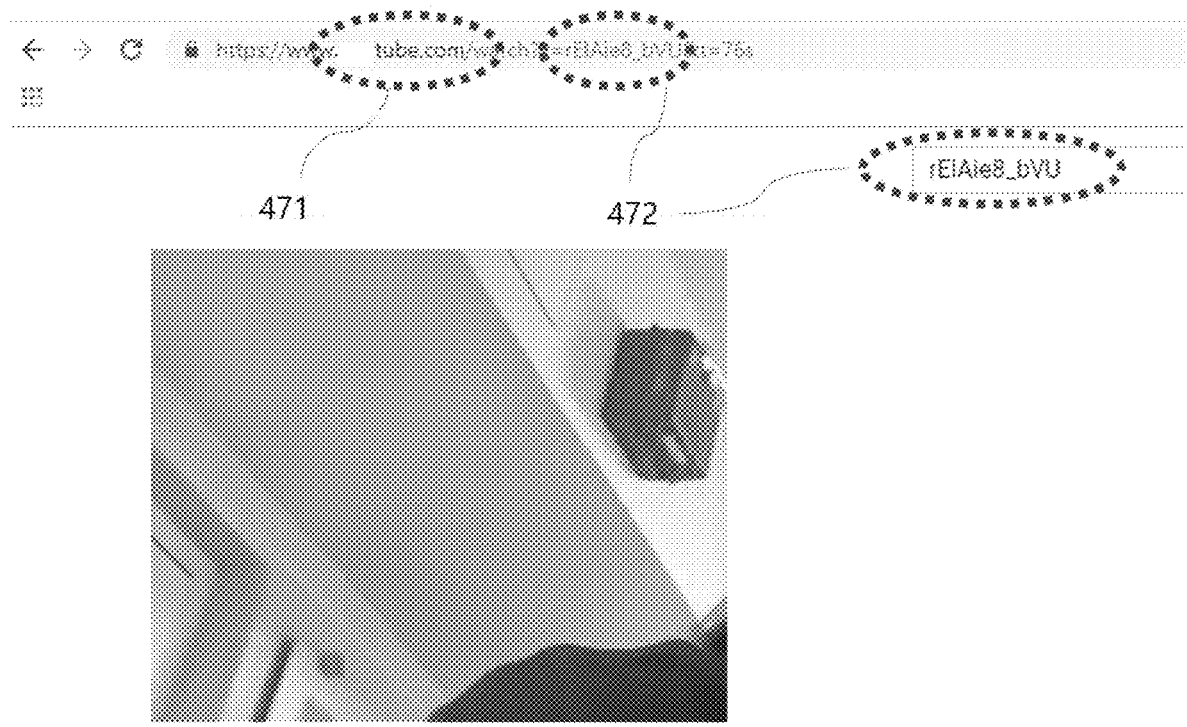
FIG. 4 is a picture showing an example of video content implemented by a typical OSS.

FIG. 4 is a picture showing an example of video content 113 implemented by YouTube, which is the typical OSS 102, wherein the provider (YouTube) of the OSS 102 is displayed in a domain 471 of an address window.

Figure 5:
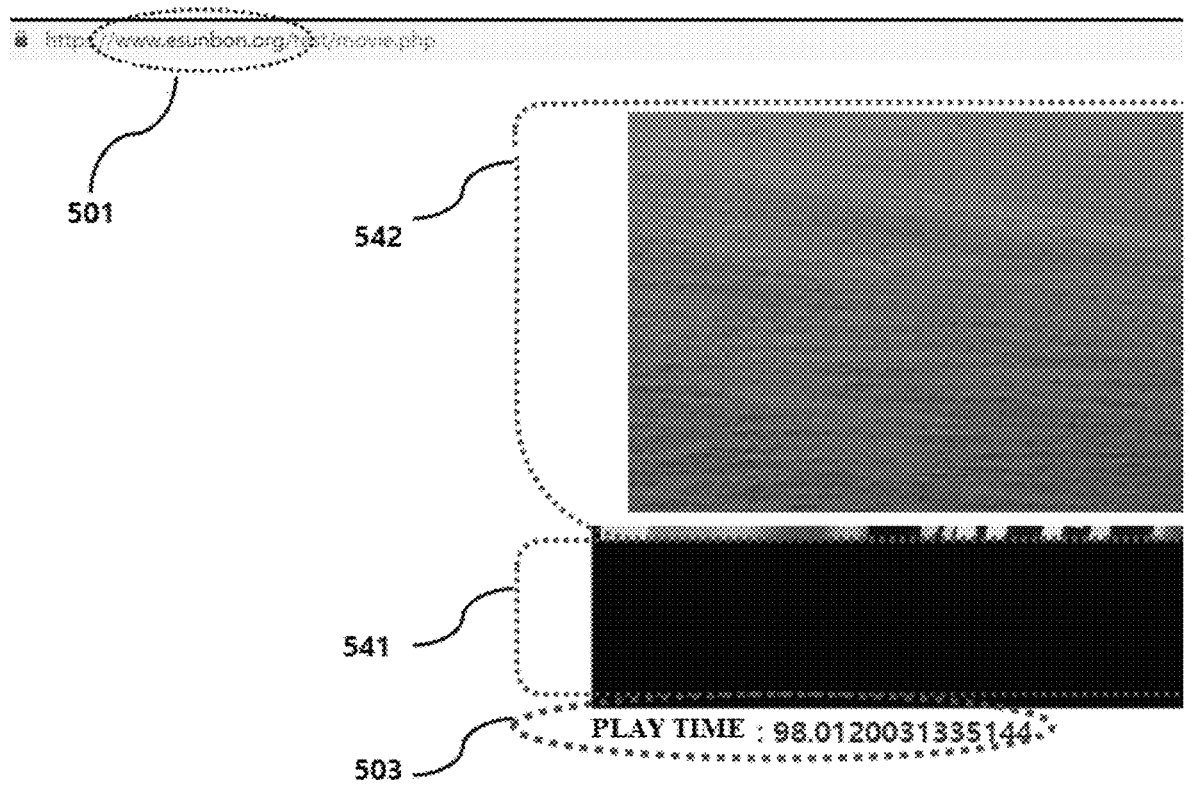
FIG. 5 is a picture showing a state in which video content provided by a typical OSS is embedded into a VCS according to the present invention.

FIG. 5 is a picture showing a state in which video content 113 provided by a typical OSS 102 is embedded in a video curation service page 140 and 501 (www.esunbon.org) according to the present invention by using the iframe player API 114, wherein subtitle window (ESF, 141, 541) located outside the VIF 142 and 542 in which the video content 113 is played and an information window 503 showing the VPT detected in the SJS 143 are generated. In the VIF 542 and 142, the video content 113 of the OSS 102 is being played. In the subtitle window (ESF) 141 and 541 existing outside the VIF 142 and 542, the subtitle data 118 and 818 are displayed in synchronization with the VPT by the SJS 143 (lines 15 to 110 in FIGS. 6, 7, and 8). In the present embodiment, the VPT found very frequently by the SJS 143 by using the iframe player API 114 is continuously updated and displayed in the play time information window 503.

Figure 9:
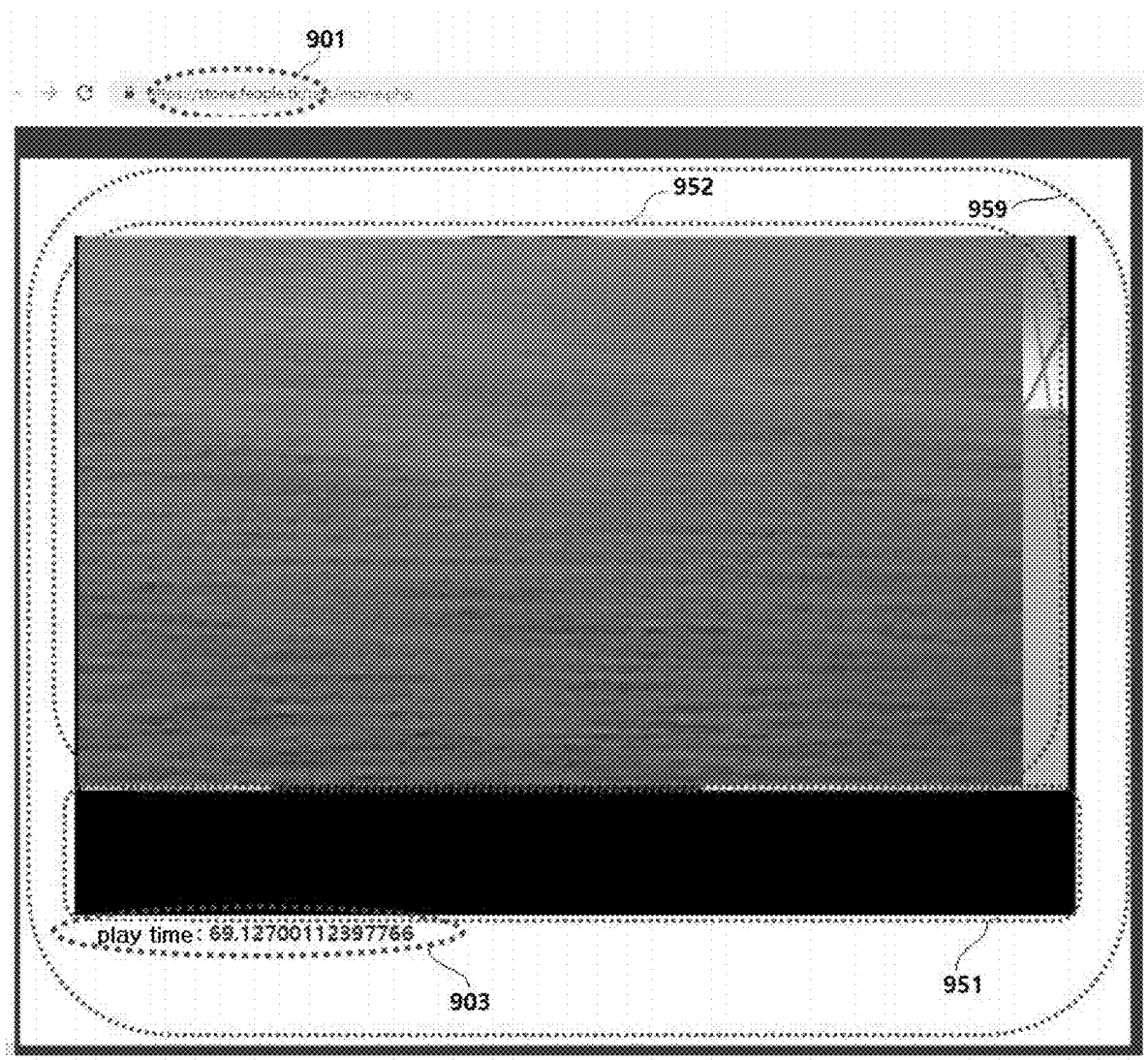
FIG. 9 is a picture showing a state in which a VCS according to an embodiment of the present invention is iframe-embedded into an external web page again.
Figure 10:
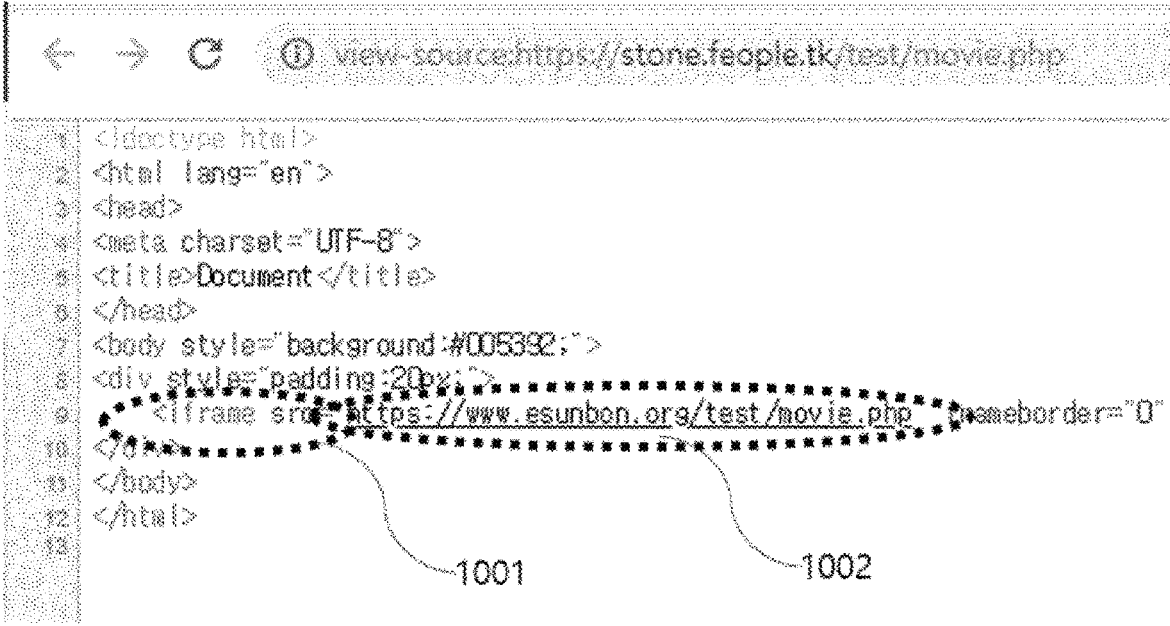
FIG. 10 is a diagram illustrating an embedding code for iframe embedding of subtitle-enriched video (SEV) in an external web page illustrated in FIG. 9 in a cascading branching iframe method.

FIG. 9 is a picture showing a state in which the web/app pages 140 and 501 of the VCS 101 according to an embodiment of the present invention is iframe-embedded again in a CFIF method in an external page, for example, a web or app page 901 (https://stone.feople.tk) of an external learning-oriented organization, and FIG. 10 is a diagram showing an example of an embedding source code for performing iframe embedding in the CFIF method in the web or app page 901 of the external learning-oriented organization illustrated in FIG. 9. In the source code of FIG. 10, line 9 (character string starting with '<iframe' and ending with '</iframe>', 1001 and 1002) is the embedding code, and the character string "https://www.esubon.org/test/movie.php" in the embedding code indicates the page 959 embedded in FIG. 9, and is referred to as the source page 501 (https://www.esubon.org/test/movie.php). As double cascading (another iframe source within iframe sources of different domains), video ID information 601 and 472 (play_youtube=rElAie8_bVU) existing in the domain 471 of the OSS 102 is included in the source page 501 according to the JavaScript expression method, not the general address window URL expression method. With forked with this, as normal embedding—that is, data present in the source page (https:// www.esubon.org/test/movie.php) shown in the embedding code-information 602 and 802 about the productions of the subtitle windows (ESF) 141 and 541 and the SJS 143 (lines 15 to 111 of the page source in FIGS. 6, 7, and 8) are also included.

That is, in order for the viewer 104 to easily perform iframe-embedding in the external page 901 including the SEV 149, 542+541 , and 959, the present imvention provides the CFIF embedding code including; (a) video ID information 472 and 601 existing in the domain 471 of the OSS 102, constituting a part of the SJS 143, and information for loading it into an iframe (lines 15-31 of FIG. 6); (b) information 602 and 802 about frame production of the subtitle windows (ESF) 141 and 541; (c) a logic (lines 34 to 95 in FIGS. 6, 7, and 8) and subtitle data 118 and 818 for synchronizing the video flow in the VIF 142 and the flow of the subtitles 118 and 818 in the subtitle window (ESF) 141, constituting the reaming part of the SJS 143.

That is, according to the present invention, the contents of the source page 1002 (https://www.esubon.org/test/movie.php) displayed in the embedding codes 1001 and 1002 include ID information 472 of the video content 113 existing in the domain 471 of the OSS 102 and information that can load the video as an 'iframe within an iframe', beyond the domain 501 to which the page source page 1002 (https://www.esubon.org/test/movie.php) belongs. That is, the embedding code for posting the video content 113 and the subtitle data 118 as an iframe on an external page includes information to load the source page included in the domain of the VCS, ID information 472 of the video content 113 existing in the domain 471 of the OSS 102 and information capable of loading the corresponding video content 113 into an iframe within an iframe. Since information 601 about 'another iframe with a different domain' is included in the contents of the page indicated by the iframe source 1002 included in the embedding codes 1001 and 1002 (line 9 of FIG. 10), it is 'cascading' (double embedding: an embedding in which the domain exposed on the surface of the embedding code and the domain of the sub-embedding source included therein do not match), and it is branched from this and becomes 'forked' in that logic or data exists in the iframe source 1002 itself. For this reason, the iframe embedding by the embedding code 1002 provided by the present invention is called 'cascading forked iframe (CFIF)'. On the other hand, normal embedding is an embedding in which data to be embedded exists in a domain exposed on the surface of the embedding code.

(III) Obtaining and Providing Viewing Status Information for Learning/Viewing Management According to another embodiment of the present invention, (a) a part of the web/app page 140 (not illustrated, hereinafter 'gallery') existing in the VCS 101 is allocated to the curator 105, and the curator 105 posts a recommendation list 181 for a video worth watching or a video to watch among SEVs 149 to the page (gallery) assigned to the curator 105; (b) viewers (members) 104 participating in the gallery are recruited as members (182); (c) the VSI 183 for each individual video content 113 of each member 104 is received from the VC S 101; and (d) the curator 105 provides information 183 about learning/viewing of video contents of the member 104 (184), thereby managing or encouraging the learning state. That is, the VCS 101 provides the VSI 183 of the member 104 to the curator 105.

In the present specification, the curator 105 is a person who wants to develop an organization or human network by utilizing the video content 113 provided by the OSS 102 to manage or encourage the learning/viewing of the member 104. For example, the curator 105 is a person who engages in activities related to learning-oriented organizations such as cyber schools, cyber churches, and cyber NGOs. The member 104 is a person who wants to receive a learning/viewing management guidance service provided by the curator 105. In order for the curator 105 to carry out meaningful learning/viewing management encouragement activities 184, the curator 105 must be provided with information about when and from which point the member 104 imprinted the predetermined video content 113, that is, the VSI 183. Accordingly, the VSI 183 includes information "when and from which point to which point the individual viewer 104 watched the individual video 113".

By providing the VSI 183 to the curator 105, the curator 105 can develop meaningful learning/viewing management or encouragement activities 184 for the imprint of the member 104. In the past, there are many people who recommend video contents and help learning/viewing through iframe posting of 'worthy videos' or have-to-see videos' on blogs or bulletin boards. However, in this case, the VSI 183 for the individual video content 113 of the individual member 104 cannot be obtained. When the VSI 183 is not secured, meaningful management or encouragement for learning/viewing of individual viewers (members) 104 cannot be performed.

In order for the VCS 101 to secure the VSI 183 of the viewer (member) 104 and transmit it to the curator 105, the present invention includes;

(1) a step in which the job posted in (2.2.6) of the above (I) is executed, that is, a step in which the SJS 143 transmits the PSI 115 such as the VPT to the VCS 101 periodically (for example, at intervals of 1 second) at a frequency (for example, at intervals of 1 second) sufficient for the VCS 101 to calculate the VSI 183;

(2) a step in which the VCS 101 uses the PSI 115 to generate information about when and from which point to which point the corresponding viewer 104 watched, that is, the VSI 183; and (3) a step in which the VCS 101 provides the VSI 183 to the curator 105.

Therefore, in the present invention, the members 104 who want to participate in learning are recruited (182) to establish the curator 105 which take action (184) to manage and encourage learning/viewing of the members 104 with respect to the video content 113, so that an OSS ecosystem with a three-participant category structure including the video publisher 169, the viewer 104, and the subtitlist 106 evolves further into an OSS ecosystem with a four-participant category structure illustrated in FIG. 2.

(IV) External Server Link: Obtaining VSI by Using iframe Player API for SEV

Figure 3:
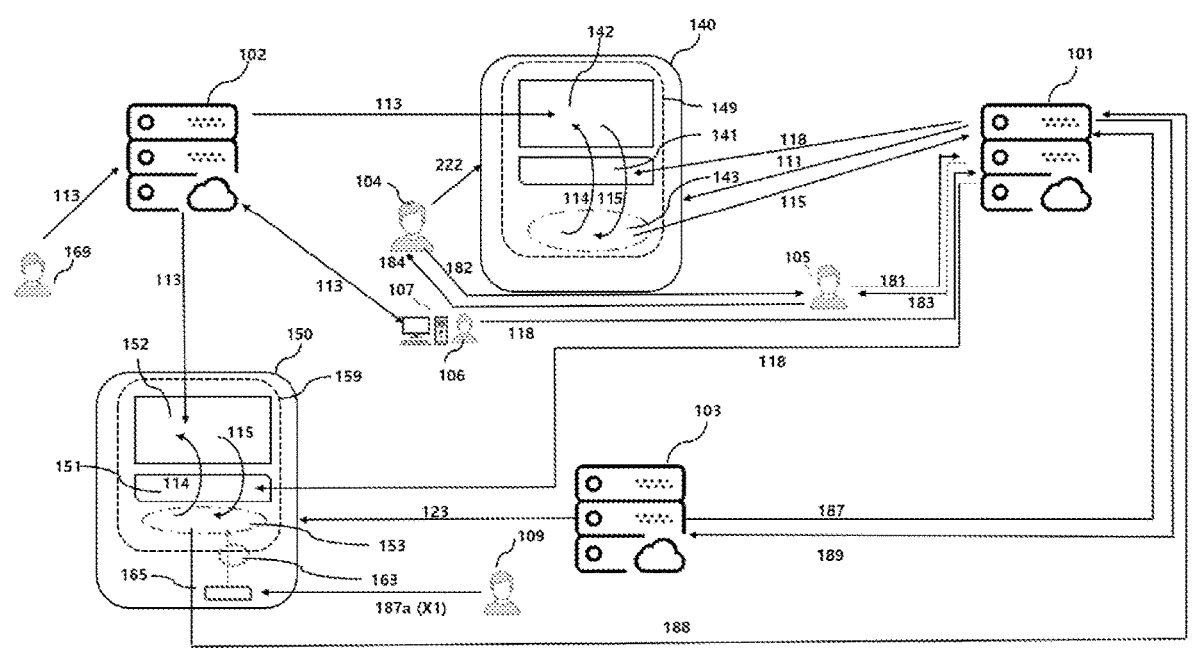
FIG. 3 is a diagram for describing an interworking process of a web page/app of a video curation service (VCS), a web page/app of an external learning oriented organization, an OSS server, a video curation service (VCS) server, and an external learning oriented organization server in a video curation service method according to another embodiment of the present invention.

FIG. 3 is a diagram for describing an interworking process of the OSS 102, the VCS 101, the external learning-oriented organization server 103, the web page/app 140 of the video curation service, and the web page/app of the external learning-oriented organizations 150 in the video curation service method according to another embodiment of the present invention. As illustrated in FIG. 3, according to another embodiment of the present invention, the learning-oriented organization embeds and posts the SEV 159 to the web/app 150 provided by its own server 103 in an iframe method, and searches the VSI 189 of the self-member 109 for the SEV 159 from the self-server 103.

To this end, in the present invention, (a) the VCS 101 receives a value indicating only the uniqueness that allows the user to know that it is a different person, although hidden, (hereinafter, the viewing ID code value 187 (e.g., person Xn) instead of information that can identify the self-member of the learning-oriented organization from the learning-oriented organization server 103 (hereinafter referred to as self-member ID information); and (b) the VCS 101 obtains the VSI of the corresponding viewing ID code value 187, and transfers the VSI 189 of the corresponding viewing ID code value 187 to the learning-oriented organization server 103. The viewer ID code value 187 (Xn) is data that teaches only the individuality of a viewer subject, for example, in the form of 'person Xn', with the true ID of a specific self-member hidden.

In the external server interworking method according to the present embodiment, in order to post the SEV 159 to the learning-oriented organization's own web/app 150 by using the iframe player API method, the iframe player API 163 for the SEV 159 is provided. The server 103 of the learning-oriented organization uniquely issues the viewing ID code value 187 (e.g., person Xn) to the self-member 109. In the web/app page 150 of the learning-oriented organization 103, when the self-member 109 watches the SEV 159, JavaScript 165 that transfers the viewing ID code value 187a (for example, person X1) to the SJS 153 is included. The SJS 153 that receives the viewing ID code value 187a (e.g., person X1) transmits, to the VCS 101, the viewing ID code value 187a (e.g., person X1) and the PSI such as the VPT frequently (e.g., 1 second) as a paired value 188. The VCS 101 performs accumulation and calculation thereon to obtain the VSI 189 corresponding to the viewing ID code value 187a (for example, person X1), and transmits the VSI 189 to the server 103 of the learning-oriented organization. More Details will be Described Below.

(1) The learning-oriented organization server 103 (a) allocates the viewing ID code value 187 (e.g., person Xn) to the self-member individual 109; and (b) when the self-member 109 watches the SEV 159, inputs the viewing ID code value 187a (X1) to the iframe player API 163 of the SEV 159. The input of the viewing ID code value 187a (X1) can be implemented by embedding the JavaScript 165 that performs the corresponding operation in the web/app page 150. In the sense that the native JavaScript 165 exists in the web/app page 150 self-produced by the learning-oriented organization 103, it is referred to as aboriginal JavaScript (AJS) 165.

(2) At this time, the VCS 101 provides the SEV 159 by using the iframe player API method, and the learning-oriented organization server 103 transmits the source file 123 of the web or app page 150 for viewing video content to the member terminal in accordance with the request (selection, command, etc.) of the member 109 having the predetermined viewing ID code value 187a (X1), drives the web or app page 150 for viewing video content in the member terminal, and plays the SEV 159.

(3) The SJS 153 included in the web page 150 that plays the SEV 159 receives the viewing ID code value 187a (X1) from the AJS 165, and plays the SEV 159 through the iframe player API 163. That is, when the self-member 109 having the predetermined viewing ID code value 187a (X1) selects and plays the SEV 159, the AJS 165 included in the learning-oriented organization web/app page 150 transmits the viewing ID code value 187a (X1) of the member 109 to the SJS 153, and the SJS 153 plays the SEV 159 through the iframe player API 163.

(4) The SJS 153 included in the driving web page 150 of the SEV 159 transmits, to the VCS 101, the paired value 188 obtained by matching the received viewing ID code value 187a (X1) and the PSI (as specified in '(2.2.6)' of the above '(I)') such as the VPT.

(5) The VCS 101 obtains, from the paired value 188, information about the VSI 189 corresponding to the unique viewing subject indicated by the viewing ID code values 187a (X1), indicating that the unique viewing subject watched the SEV 159 from which point to which point, and transmits this to the learning-oriented organization server 103 through server-to-server communication.

(6) The learning-oriented organization server 103 receiving the VSI 189 corresponding to the viewing ID code values 187a (X1) identifies the self-member 109 indicated by the viewing ID code value 187a (X1) and establishes the VSI (189) information about the self-member 109.

(V) Third Value-Added Service by Using iframe Player API

The method in which the present invention uses the iframe player APIs 114 and 163 is completely different from the existing method of using the iframe player API 114 provided by the OSS 102. In the present invention, in order to provide the third party value-added service, the iframe player API 114 of the OSS 102 is used, and the iframe player API 163 of the present invention is provided.

In the method used by the existing iframe player API 114, the iframe player API has been used so that the page side that accepts some of the functions provided by the OSS 102 in its own web/app (340 of FIG. 1) can conveniently be used by its users. For example, even the services using the iframe player API 114 provided by the deepest and richest OSS 102 such as Twitter provide only some of the functions provided by the existing OSS 102. The case of embedding YouTube (accepted page) into Twitter (accepting page) will be described as an example.

Figure 11:
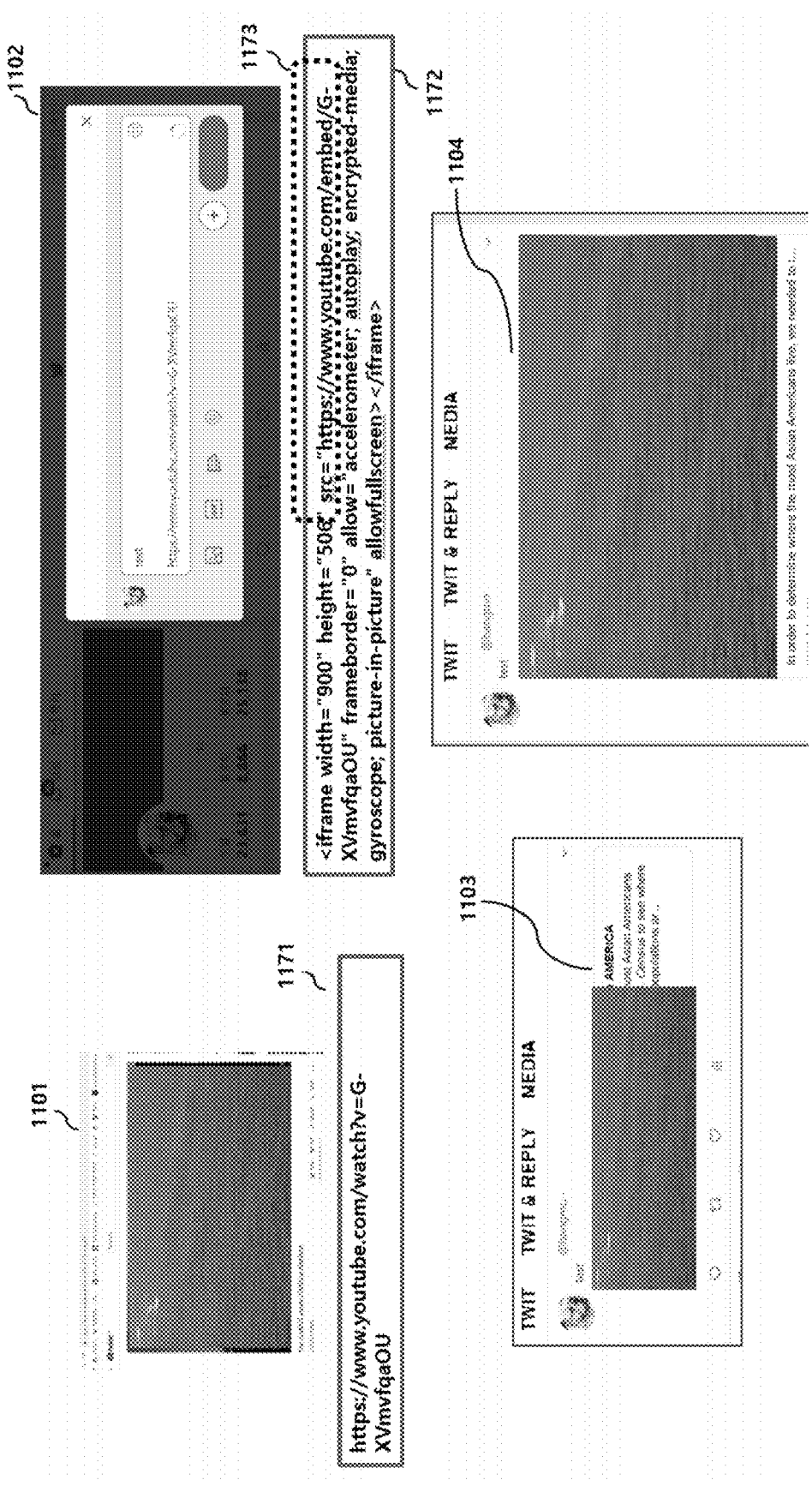
FIG. 11 is a picture showing a state in which an iframe player API of a typical OSS is used in an external page.

(1) Processing Embedding Source URL to be Used by JavaScript that Works with iframe Player API FIG. 11 is a picture showing a state in which an iframe player API of a typical OSS is used in an external page. As illustrated in FIG. 11, the user simply captures the URL 1171 displayed in the address window of the user page 1101 of YouTube and inputs it to Twitter (1102). The embedding fails if finding and entering the embedding code 1172 on the YouTube page 1101 or finding and entering the embedding source 1173 included in the embedding code 1172 with the desire to "try to be more precise".

Upon receiving the YouTube user page URL 1171, a Twitter server (not illustrated) extracts video source information (part of 1173, "G-XVmvfqaOU") to be used for interworking with the iframe player API. In this way, 'extracting the video source information (part of 1173, "G-XVmvfqaOU") to be used in the iframe player API from the URL 1171 of the OSS user page' is not included in the iframe player API, but is a function that must be implemented almost indispensably for user convenience in the service that iframe-embeds the OSS by using the iframe API player, such as Twitter.

(2) Thumbnail

Twitter obtains OSS video source information (part of 1173, "G-XVmvfqaOU") extracted from the user's page URL 1171, and displays the YouTube page as a thumbnail 1103. When the user clicks the thumbnail 1103, the video window 1104 is activated and the play proceeds.

(3) Resume Play

While the user's viewing continues, the Twitter server periodically accumulates VPT or player PSI to produce VSI information, from which section the user watched to which section. If the user closes Twitter or the page where the video is embedded, and then, plays the video again, Twitter executes 'resume play' by using the 'function to start video play by designating a specific point' provided by the iframe player API, based on the VSI.

The above characteristics represented by thumbnails and resume play are the limitations of services that implement the 'iframe player API' function in the deepest and richest way, such as Twitter. In other words, the method used by the iframe player API is only to implement a subset of functions provided by the OSS in its own service.

Twitter uses the iframe player API for the purpose of implementing (a) a function (thumbnail function) that is initially presented as a thumbnail and then opened as a video window when the user clicks the thumbnail, and (b) a function (resume play) of executing a resume play when the user wants to watch the video again after stopping watching the video. However, the thumbnail function or the resume play function is only a part of the functions provided by the OSS in its own web/app. That is, the iframe player API is used only for implementing, on the 'accepting pages' (Twitter page), a subset of the functions provided by the OSS in its own web/app even in the case of using it very deeply and richly like Twitter.

On the other hand, the present invention provides the CFIF embedding code to include the SEV 140 as the iframe on the external page, the curation that connects curators 105 who want to organize learning-oriented organizations and viewers 104 who want to participate in such organizations, and the 'SEV iframe player API' that allows learning-oriented organizations to iframe-embed the SEV 159 in their web/app 150, and provides interworking with the external server characterized by providing self-member VSI for the SEV 159 in such a manner. The iframe player API is used in creative ways for innovative third-party value-added services that never existed before. The present invention implements an innovative third-party value-added service in a legal manner that does not infringe on the rights and interests of the OSS or the video publisher by utilizing the iframe player API.

As described above, in the present specification, 'OSS' refers to a streaming service that: (a) allows anyone to post or view video content; (b) provides a search API; (c) provides an iframe link to the outside; (d) provides an 'iframe player API' so that, regarding video streaming by OSS within an Iframe, a page accepting this (accepting page') producer can obtain information related to video content being played or manipulates the video play method. Dominant services such as YouTube or Dailymotion all have the above OSS properties. In conjunction with the OSS, the present invention has achieved the following effects.

(i) Integrated Viewpoint: First, the Present Invention Allows Video Content of Various OSS to be Searched and Viewed in the VCS Domain Provided by the Present Invention.

(ii) Subtitlist

Second, in the present invention, while making it possible for foreign language proficient people who want to make high-quality video contents of OSS accessible to anyone on a global level, regardless of language or cultural barriers, to become the category of participants who can freely produce and post subtitles, that is, subtitlist, the 'SEV' created by their contributions is made available to viewers, so that the existing OSS ecosystem with a two-participant category structure including a video publisher and a viewer is converted into an OSS ecosystem with a three-participant category structure including a video publisher, a viewer, and a subtitlist.

On the one hand, smartphones with built-in high-definition cameras have become widespread, enabling anyone, anywhere, anytime to create videos. On the other hand, due to the widespread spread of individual-perspective-based communication such as SNS, the accumulation and distribution of OSS video content are growing explosively. Accordingly, on the one hand, there are many foreign language speakers who want to spread high-quality OSS video beyond language and cultural barriers. On the other hand, there is a strong need for viewers to watch and enjoy high-quality OSS videos made in foreign languages in their own language. Nevertheless, the existing OSS does not take a policy of promoting free subtitle creation and posting by any third party.

The present invention makes it possible for any third party to freely create and post subtitles in a way that does not infringe the interests of OSS and video publishers, that is, in a synchronized duplex parallel play manner in which the subtitle window (ESF) 141 is placed outside the VIF 142 where the video of the OSS is played and the video flow in the VIF 142 is synchronized with the subtitle flow in the subtitle window (ESF) 141.

(iii) Embedding Code for External Page

Third, when the viewer embeds the SEV 149 according to the present invention is iframe-embedded on the bulletin board, blog, or the like, (a) regarding the VIF 142, cascading double embedding information is included in an OSS domain page, i.e., 'iframe within an iframe'; (b) regarding the subtitle window (ESF) 141 and the SJS 143, the embedding code that points to the cascading forked iframe embedding source including typical embedding information that resides within the page in the VCS domain (embedding where embedding-related information exists on pages within the domain indicated in the embedding code) is provided so that the viewer can easily execute iframe embedding. As a result, the SEV 149 according to the present invention can be easily embedded in countless blog or bulletin board pages without limitation to being posted on the web/app page 140 of the VCS according to the present invention. Accordingly, the viewer can also enjoy the SEV 149 according to the present invention without necessarily visiting the web/app page 140 provided by the VCS.

(iv) Curation

Fourth, in the present invention, for people (curators) who want to develop activities to manage or encourage member learning/viewing by utilizing a variety of high-quality OSS video content, and for viewers who want learning activities using videos, (a) a page (gallery) where the curators can present their recommended videos is provided to each curator in the form of a list; (b) the VSI 183 of members who have joined the gallery is provided to the curator 106; (c) so that curators can manage meaningful learning/viewing about members; and (d) the viewers who want to learn using video can participate in a meaningful learning network.

Therefore, the OSS ecosystem evolved into the three-participant category structure including the video publisher, the viewer, and the subtitlist due to the existence of the 'subtitlist 106' has evolved into the OSS ecosystem with the four-participant category structure including the video publisher, the viewer, the subtitlist, and the curator.

(v) External School

Fifth, the present invention provides an external server interworking means characterized in that: (a) the SEV iframe player API interworking with the AJS 165 included in the web/app page 150 of the learning-oriented organization that accepts the SEV 149 in the iframe method is provided; (b) when the AJS 165 starts playing the SEV 159, the viewing ID code value 187a (X1) assigned to each member by the learning-oriented organization server 103 is input to the SJS 153 built into the SEV through the SEV iframe player API; (c) the SJS 153 bundles the viewing ID code values 187a (X1) with the video-progress-check information as a pair and transmits them to the VCS server according to the present invention; and (d) the VCS server accumulates and calculates a paired value in which the viewing ID code values 187a (X1) and the video-progress-check information are bundled, secures the VSI based on the viewing ID code value 187a (X1), and transmits it to the server 103 of the learning-oriented organization. Therefore, learning-oriented organizations can manage or encourage learning/viewing of members while using countless high-quality video contents posted on OSS as their own video teaching materials.

What is claimed is:

1. A video curation service method comprising:
    a step in which, regarding predetermined video content provided by an open streaming service server (OSS), a subtitlist creates subtitle data and uploads the subtitle data to a video curation service server (VCS);
    a step in which the VCS drives a web or app page for viewing video content in a viewer terminal in accordance with a request of a viewer;
    a step in which a learning-oriented organization server: (a) allocates a viewing ID code value to a self-member individual; and (b) when the self-member watches subtitle-enriched video contents (SEV), inputs a viewing ID code value (X1) to an iframe player application program interface (API) of the SEV:
    a step in which the VCS provides the SEV by using an iframe player API method, and the learning-oriented organization server drives the web or app page for viewing the video content in a member terminal in accordance with a request of a member having the predetermined viewing ID code value (X1) and plays the SEV;
    a step in which a synchronization JavaScript (SJS) included in the driving web page of the SEV transmits, to the VCS, a paired value obtained by matching the received viewing ID code value (X1) and player status information (PSI) including a play time (VPT); and
    a step in which the VCS obtains, from the paired value, information about viewing status information (VSI) corresponding to a unique viewing subject indicated by the viewing ID code value (X1), indicating that the unique viewing subject watched the SEV from which point to which point, and transmits this to the learning-oriented organization server through server-to-server communication,
    wherein the web or app page for viewing the video content comprises a video iframe window (VIF) for playing the video content transmitted from the OSS, and a subtitle window (ESF) for externally playing the subtitle data transmitted from the VCS, and the subtitle is played in a the ESF in synchronization with the VPT of the video content.

2. The method of claim 1, wherein the web or app page for viewing the video content detects the PSI including the VPT of the video content played in the VIF by using the iframe player API provided by the OSS, detects subtitle play point information (SPPI) included in the subtitle data, and synchronizes the VPT of the video content with the play of the subtitle.

3. The method of claim 1, wherein the web or app page for viewing the video content periodically transmits the PSI including the VPT to the VCS, and the method further comprises a step of calculating the VSI of the video content of the viewer.

4. The method of claim 1, wherein the method further comprises:
    a step in which the VCS generates a message containing a notification indicating that translation subtitle to be played in the ESF is added by a video curation service user;
    a step of inputting the message to a comment on a page of the OSS on which the corresponding video content is posted; and
    a step of, when a video publisher disapproves the attachment of the translation subtitle, automatically deleting the translation subtitle from the web/app of the VCS.

5. The method of claim 1, wherein the method comprises a step of posting the video content played on the VIF and the subtitle data played on the ESF as an iframe on an external page.

6. The method of claim 5, wherein an embedding code for posting the video content and the subtitle data as an iframe on an external page comprises information to load a source page included in a domain of the VCS, ID information of the video content existing in a domain of the OSS, and information capable of loading the corresponding video content into an iframe within an iframe.

7. The method of claim 1, further comprising:
- a step of allocating a gallery, which is part of the web/app page existing in the VCS, to a curator, wherein the curator posts a recommendation list among the SEV to a page assigned to the curator;
- a step of recruiting viewers participating in the gallery as members;
- a step of receiving, from the VCS, the VSI of each individual video content of the viewer; and
- a step in which the curator provides information about video content learning/viewing of the viewer to manage or encourage a learning state.

* * * * *